3,301,325
PETROLEUM RECOVERY MATERIALS AND PROCESS

William B. Gogarty, Littleton, and Russell W. Olson, Denver, Colo., assignors to Marathon Oil Company, Findlay, Ohio, a corporation of Ohio
No Drawing. Filed Nov. 5, 1965, Ser. No. 506,603
4 Claims. (Cl. 166—9)

This application is a continuation-in-part of our co-pending United States patent application Serial No. 212,-134, filed July 24, 1962.

This invention relates to oil recovery and more particularly to the use of micellar solutions made from liquefied petroleum gas (LPG), Binder et al., United States Patents 3,149,669 and 3,208,517, and Meadors, United States Patent 3,208,515, teach the use of emulsions in secondary-type recovery. Holm et al., United States Patent 3,082,822, Jones, United States Patent 3,126,952, and Csaszar, United States Patent 3,163,214 teach the use of other types of micellar systems in secondary oil recovery. The teachings of all of these patents fail to overcome the central problem facing the engineer desiring to formulate a successful replacement for waterflooding. To reach this desired goal, the flooding medium must be substantially miscible with both the crude in the formation and with a drive material, must have a mobility comparable to that of the fluids in the formation, and must be inexpensive. To date, those skilled in the art have sacrificed miscibility for economics. In doing so, oil recovery has suffered and the processes, as taught, leave much to be desired.

The LPG micellar solutions of this invention aid in overcoming the prior art problems in that the LPG's are quite economic when compared to the price of most hydrocarbons and provide a basis for a substantially miscible flooding material. The addition of water and a relatively high concentration of surfactant provide a basis for forming micellar solutions having variable viscosities.

We have now discovered that good oil recoveries can be obtained through the use of micellar solutions. Such solutions are intended to encompass micellar solutions of surfactants and cosurfactants in LPG's and oil-external microemulsions made up with LPG's as the external phase.

The micellar LPG solutions utilized in our process are phase stable and substantially transparent. They are, further, stable to the ions and fluids in the formation, i.e., they do not break in the presence of these materials. As the term "micellar solution" implies, the surfactant concentration (including any cosurfactants or cosolvents) is always substantially above the critical micelle concentration of these materials in LPG.

LPG, as used here, encompasses individual liquefied hydrocarbons and mixtures of liquefied hydrocarbons having a boiling point less than about 10° C. at 760 mm. Hg. Ethane, propane, isobutane, butene, and neopentane are included in hydrocarbons coming within the above definition.

Micellar solutions making up the compositions of this invention can contain additives to insure optimum recovery operations; for example, corrosion inhibitors can be used in sour fields and bactericides can be used where necessary.

Preferred microemulsions useful in this invention contain up to about 10-20% water. Preferably, these microemulsions contain, by volume, from about 50 to about 80% LPG; from about 10 to about 40% water; and at least about 8% surfactant; from about 0.1 to about 5% isopropanol or other cosurfactant can also be utilized. Surfactants which can be used include the various nonionic, cationic, and anionic surfactants. We prefer to utilize anionic surfactants such as higher alkylaryl monosulfonates, particularly alkylnaphthenic monosulfonates, wherein the alkyl radical contains from about 10 to 20 carbon atoms.

The type of surfactant utilized depends upon the temperature of the formation and the hardness, including salinity, and pH of the connate water and the water used to make up the soluble oil. It would be futile to use a detergent such as sodium oleate in a formation containing relatively high concentrations of calcium and magnesium ions, as the precipitated calcium and magnesium soaps would plug the formation. Similarly, where there is a natural detergent in the crude, a surfactant having a similar ionic charge must be used to avoid precipitating an insoluble reaction product.

Water is the preferred polar solvent and is preferably soft. However, hard tap water and even relatively brackish waters can be used with detergents which are stable to the contaminating ions. The water utilized can be of a class designed to overcome problems arising out of the water sensitivity of a particular formation. Thus, if flooding is carried out in a water-sensitive formation, brackish water must be used to make up the microemulsions.

The alcohols useful as cosolvents in the soluble oils of this invention contain up to about 8 carbon atoms. Ethanol, isopropanol, 2-pentanol, isobutanol, cyclohexanol, cresol, and nonylphenol are preferred alcohols. The secondary lower aliphatic alcohols, particularly isopropanol, are the most preferred alcohols for use in the composition of the bank of this invention. Lower molecular weight amines, ketones, and the like can also be used where desired.

The microemulsions of this invention are generally prepared by adding a cosurfactant to the LPG and dissolving surfactant in the mixture. Where water is to be added, it is stirred into the surfactant in hydrocarbon solution. The addition of water to a system made up of butane, Shell commercial sulfonate, isopropanol, and sodium sulfate is illustrative of viscosity behavior on the addition of water. In the particular system described, the initial apparent viscosity is about 0.29. On the addition of 4% water, the apparent viscosity is increased to 1.4 cp. On the addition of 6% water, the apparent viscosity is over 2 cp. At a 10% water concentration, the apparent viscosity is down to below about 1.8 cp. The viscosity continues downwardly until, in the 13-20% water range, it again increases in viscosity and the apparent viscosity continues to rise slightly on the addition of water until the system becomes unstable at about 21% water content.

The amount of micellar solution used in secondary oil recovery increases, though the percent of pore volume decreases, with the volume of the wet reservoir to be swept. Thus, 2.5-5.0% of pore volume are adequate to flood a 40-50-acre area, while 5-10% of pore volume are necessary for a 5-10-acre area. We prefer to inject into the formation sufficient micellar solution to occupy from 1-20% and at least about 3 to about 10% of the pore volume of the formation. Thirty percent, or more micellar solution can be utilized. However, such large amounts of micellar solution can prove economically unattractive.

It is difficult to define the exact amount of micellar solution required in this process. Ideally, sufficient micellar solution should be used to provide a substantially continuous zone of micellar material, at the perimeter of the area from which it is desired to recover crude oil, between the crude in the formation and the material used to drive the micellar solution slug. Sometimes, it may be more economical to use a small slug, expecting substantial breaks in the bank at the final perimeter, to obtain only a partial recovery of crude rather than to use a large slug and obtain a complete recovery in the swept area. The amount of micellar solution required will also vary with the area to be swept. Crude viscosity, substantial variations in formation permeability, and other considerations also affect the pore volume to be used.

The apparent viscosity—i.e., the ratio of shear stress to rate of shear, the shear stress exhibited by the liquid being the result of a particular rate of shear—of compositions containing a particular liquefied hydrocarbon can be regulated by adjusting the amount of water in the composition, as indicated previously. It is preferred that the leading edge of the micellar solution has a high oil content, as the micellar solutions sorb both oil and water from the formation. However, the viscosity of the micellar solution can be reduced gradually to that of a low viscosity drive fluid, such as water.

The following specific examples more fully illustrate our invention, but it is not intended that our invention be limited to the exact liquefied petroleum gas taught, surfactants, alcohols or procedures utilized. Rather, it is intended that all equivalents obvious to those skilled in the art be included within the scope of our invention as claimed.

*Example I*

A stock solution of 76%, by volume, butane; 19% petroleum sulfonate; and 5% isopropyl alcohol was made. Sodium sulfate, 3% based on grams of active sulfonate, was added. A mixture of water and the stock solution was prepared under pressure by adding water incrementally. The following phenomena exists:

(1) At room temperature, 38° C. (100° F.), and 51.5° C. (125° F.), a 10% water content solution existed in one phase only.

(2) At a water concentration of 20%, one phase existed at 38° C. (100° F.) and 51.5° C. (125° F.), but about 2% of a second phase existed at room temperature.

(3) Further dilution with water resulted in multiple phases at a variety of temperatures.

Set out in the examples below are a series of microemulsions which are made up from a micellar solution of hydrocarbon; surfactant; and, in some cases, a cosurfactant alcohol.

*Example II*

| | Volume percent |
|---|---|
| Arquad 2C–75 (75% active dicocodimethyl ammonium chloride) | 18.9 |
| Propane | 56.6 |
| Water | 22.6 |
| Isopropyl alcohol | 1.9 |

*Example III*

| | Volume percent |
|---|---|
| Shell sulfonate | 13.2 |
| Butane | 69.3 |
| Water | 13.0 |
| Isopropyl alcohol | 4.5 |

No inorganic salts added except those present in the sulfonate. Phase separation occurs when the water concentration is increased to 14%.

*Example IV*

| | Volume percent |
|---|---|
| Shell sulfonate | 11.85 |
| Butane | 62.15 |
| Water | 22.0 |
| Isopropyl alcohol | 4.0 |

An amount of sodium sulfate equivalent to 1.31 weight percent of the sulfonate was added. Stock solution (sulfonate, butane, and alcohol) is the same as Example III. Phase separation occurs when the water concentration is increased to 24%.

*Example V*

| | Volume percent |
|---|---|
| Atlas G–3300 (alkyl aryl sulfonate) | 16.9 |
| Butane | 50.9 |
| Water | 32.2 |

No additional inorganic salts or cosurfactants added. Phase separation occurs when water concentration is increased.

*Example VI*

| | Volume percent |
|---|---|
| Arquad 2C–75 (75% active dicocodimethyl ammonium chloride) | 14.7 |
| Butane | 41.8 |
| Water | 43.5 |

No additional inorganic salts or cosurfactants added. Phase separation occurs when water concentration is increased to 44%.

*Example VII*

A flooding operation is carried out utilizing the first microemulsion of Example I in a formation containing a Pennsylvania crude having a viscosity of about 3 cp. About 10% pore volume microemulsion is injected into the formation through the center well of a five spot. The microemulsion is driven through the formation with a brine. Crude is recovered from the surrounding production wells.

Now having described our invention, what we claim is:

1. A process for the recovery of oil from subterranean oil-bearing formations comprising injecting into said oil-bearing formation through at least one injection well drilled therein microemulsions utilizing liquefied petroleum gas in the external phase, driving the microemulsion toward at least one recovery well drilled into said subterranean formation, and recovering crude petroleum through said recovery well.

2. Micellar systems comprising microemulsions utilizing liquefied petroleum gas as the external phase.

3. The microemulsions of claim 2 wherein the liquefied petroleum gas is propane.

4. The microemulsions of claim 2 wherein the liquefied petroleum gas is butane.

References Cited by the Examiner

UNITED STATES PATENTS

| 2,331,594 | 10/1943 | Blair et al. | 252—8.55 |
| 3,082,822 | 3/1963 | Holm et al. | 166—9 |
| 3,163,214 | 12/1964 | Csaszar | 166—9 |
| 3,208,517 | 9/1965 | Binder et al. | 166—9 |

CHARLES E. O'CONNELL, *Primary Examiner.*

T. A. ZALENSKI, S. J. NOVOSAD, *Assistant Examiners.*